Oct. 5, 1943.  J. GOULDBOURN ET AL  2,331,119
LUBRICATING SYSTEM
Original Filed May 20, 1939
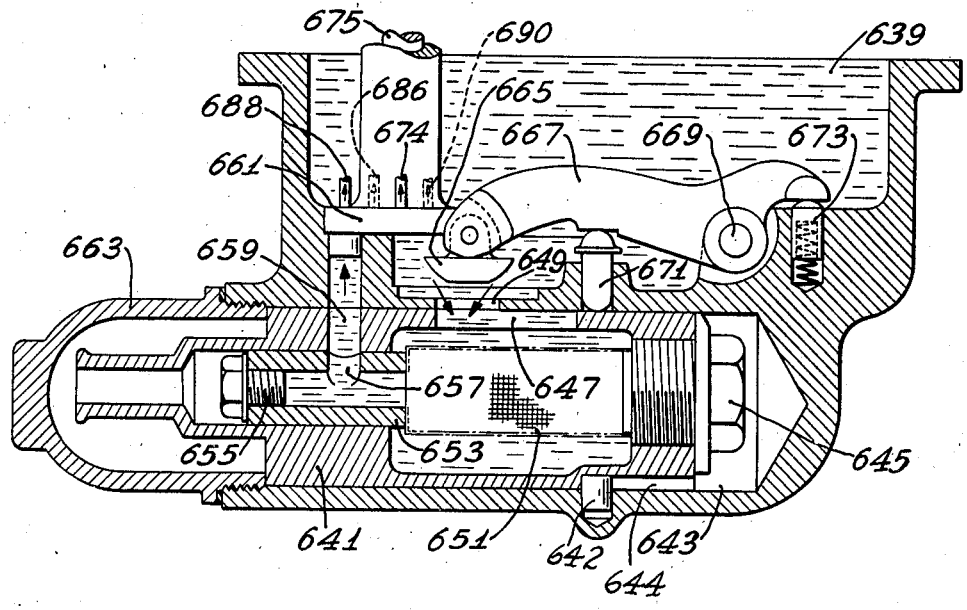
Inventors
Joseph Gouldbourn
Thomas A. Kestell
by Fish Hildreth
Cary & Jenney Attys Patented Oct. 5, 1943

2,331,119

UNITED STATES PATENT OFFICE 2,331,119

LUBRICATING SYSTEM

Joseph Gouldbourn and Thomas Aubrey Kestell, Leicester, England, assignors to United Shoe Machinery Corporation, Flemington, N. J., a corporation of New Jersey Original application May 20, 1939, Serial No. 274,794. Divided and this application May 12, 1942, Serial No. 442,644. In Great Britain June 28, 1938

4 Claims. (Cl. 184—6)

The present invention relates to lubricating systems and is herein disclosed as embodied in a construction particularly adapted for use in shoe sewing machines but also adapted for use in other types of machines which comprise operating devices and actuating connections for said devices.

The object of the invention is to provide improved means in a lubricating system whereby the lubricant used may be continuously filtered and whereby easy access may be had to the filter for cleaning without interfering with the supply of lubricant in the machine and without disturbing other parts of the apparatus.

With the above objects in view, the invention contemplates the provision in a lubricating system of a chamber through which the lubricant passes from a source of supply to the connections to be lubricated, means for removably supporting a filter in said chamber and a shut-off valve which is rendered operative by the removal of the filter to prevent the flow of lubricant into the chamber after the filter has been removed.

Other features of the invention contemplate the provision of certain novel constructions and arrangements of parts hereinafter described and claimed.

The present application is a division of application Serial No. 274,794, for Shoe sewing machines, filed May 20, 1939, and the lubricating apparatus hereinafter specifically described is embodied in the machine disclosed in said application.

Referring to the drawing accompanying this application, the figure is a sectional side elevation of an oil reservoir provided with a removable filter and a shut-off valve embodying the several features of the invention.

In the illustrated construction, oil for the lubrication of the actuating connections for the operating devices of the machine in which the illustrated construction is used is supplied from a reservoir indicated at 639. Below the reservoir is a cylindrical chamber 643 through which the oil passes on its way from the reservoir to the actuating connections to be lubricated, and in the chamber 643 is located an oil filter comprising a sleeve member or plug 641. A pin 642 projecting from the wall of the chamber 643 for engagement in a slot 644 formed in the sleeve member 641, serves to key the member 641 against rotational movement from a predetermined angular position in the chamber. The inner end of the sleeve member 641 is closed by a screw 645 in the member. The sleeve member 641 has an opening 647 formed in the top of it which is in alignment with an opening 649 leading from the chamber 643 to the reservoir 639 so that oil in the latter can flow into the sleeve member 641. The sleeve member has in it a cylindrical gauze filter 651 secured on the inner end of a cylindrical stem 653 which is pressed into a reduced portion of the bore of the sleeve member 643 near the front thereof. The stem 653 has a central bore extending through it, the front end of which is closed by a screw 655 threaded into it and the stem has formed in it an opening 657 which leads from the central bore in the stem upwardly through a bore 659 in the sleeve member 641 to a bore in a pump bracket 661 secured in the reservoir 639 which leads to a pump chamber in the pump bracket. The front end of the cylindrical chamber 643 in the reservoir 639 is closed and the sleeve member 641 is held in place by a dome-shaped cap 663 screwed into the chamber and enclosing the front end portion of the sleeve member which portion is reduced in diameter and is bored axially from its front end into the bore into which the aforesaid stem 653 is pressed. The opening 649 which leads from the reservoir 639 to the interior of the sleeve member 641 is normally open, but if the dome-shaped cap 663 is removed and the sleeve member 641 and with it the filter 651 are drawn forwardly out of the cylindrical chamber 643 in the reservoir, this opening 649 is caused to be automatically closed so that the oil in the reservoir will not escape. The opening is closed by a plug 665 which is pivoted on the forward end of a horizontal arm 667 which is pivoted at its rear end on a horizontal pin 669 in the reservoir. The arm and plug are normally held in a raised position by a vertical plunger 671 which is slidingly mounted in the reservoir. The plunger 671 engages at its upper end the arm 667 and at its lower end the sleeve member 641 to hold the arm 667 raised and the plug 665 away from the opening 649 so that the oil can flow from the reservoir into the sleeve member 641 and be drawn through the gauze filter 651 and passages in the stem 653 by the pump. If the sleeve member 641 is withdrawn from the cylindrical chamber, the plunger 671 is moved down by a spring plunger 673 behind the end of the sleeve member 641 and the plug 665 closes the opening 649 leading from the reservoir to the cylindrical chamber. The closing of the opening 649 occurs during the withdrawal of the sleeve member 641 before the rear end of the latter passes in front of the opening 649 and the rear end of the sleeve member moves rearwardly of and closes the opening 649 before it engages the plunger 671 and raises it and the plug 665 as the sleeve member is replaced in the chamber. The opening 649 is thus effectively closed before the withdrawal of the sleeve member 641 and is opened after the rear end of the member has passed the opening 649 so that no oil can flow from the reservoir 639 into the cylindrical chamber 643 and from the chamber onto the floor. The aforesaid pump bracket 661 in the reservoir is positioned below the level of the oil in the reservoir and has rotatably mounted in the aforesaid pump chamber a pair of spur gears, as is usual in this type of pump, one of which gears is secured on the lower end of a driven vertical shaft 675 rotatably mounted in the bracket. The other gear is secured on a vertical shaft rotatably mounted in the pump bracket and is driven by the first gear, the gears acting to force the oil from the reservoir along a horizontal passage in the pump bracket. The pump bracket 661 has in it four vertical holes leading from the top of the bracket into the aforesaid passage in the bracket. Pipes designated respectively at 674, 686, 688 and 690 lead up through the column of the machine from each of the four holes in the pump bracket and the pipes convey oil pumped through them to various parts of the machine.

The nature and scope of the invention having been indicated, and an embodiment of the invention having been specifically described, what is claimed is:

1. In a lubricating system for machines comprising operating devices and actuating connections therefor, the combination of a reservoir, conduits for distributing lubricant to said actuating connections, a lubricant pump, and a supply connection between the reservoir and the pump including a chamber, a filter removably supported in said chamber, a shut-off valve between the reservoir and chamber, spring means tending to close the valve, and a valve lifting lever arranged to be supported by the filter in operating position to maintain the valve in open position against the pressure of said spring.

2. In a lubricating system for machines comprising operating devices and actuating connections therefor, the combination of a reservoir, conduits for distributing lubricant to said actuating connections, a pump for forcing lubricant from the reservoir through said conduits, and a filter connection between the reservoir and the pump including a chamber beneath the reservoir, a plug removably supported in the chamber and having a filter attached thereto, a connection through said plug to the pump, a shut-off valve connection between the reservoir and the chamber, spring means tending to close the valve, a valve lifting lever arranged to be supported by the plug in operating position to maintain the valve in open position, and arranged upon removal of the plug to permit the closing of the valve.

3. In a lubricating system for machines comprising operating devices and actuating connections therefor, the combination of a reservoir, conduits for distributing lubricant to said actuating connections, a pump for forcing lubricant from said reservoir through said conduits, and a filter connection between the reservoir and pump including a chamber beneath the reservoir, a plug fitted within the chamber having a hollowed portion therein, a stem and a filter connected thereto supported within the hollowed portion, circulatory connections from the reservoir and pump through the plug to the hollowed portion and to said stem for passing lubricant through the filter, a shut-off valve connection between the reservoir and the chamber, spring means tending to close the valve, and a valve lifting lever arranged to be supported by the plug in operating position to maintain the valve in open position, and arranged upon removal of the plug to permit the closing of the valve.

4. In a lubricating system for machines comprising operating devices and actuating connections therefor, the combination of a reservoir, conduits for distributing lubricant to said actuating connections, a pump for forcing lubricant from said reservoir through said conduits, and a filter connection between the reservoir and pump including a horizontally disposed cylindrical chamber beneath the reservoir, a cylindrical plug fitted within the chamber having an axial bore therein and capping means for the bore, a hollow stem and a filter connected thereto supported within the bore, circulatory connections from the reservoir and pump downwardly through the plug to the bore and to said stem for passing lubricant through the filter, a key for registering the plug angularly in the chamber, a cap for closing the chamber, a shut-off valve connecting the reservoir with the chamber, and means rendered operative by the removal of the plug for closing said valve.

JOSEPH GOULDBOURN.
THOMAS AUBREY KESTELL.